United States Patent
Bhavaraju (10) Patent No.: US 9,431,656 B2
(45) Date of Patent: Aug. 30, 2016

(54) HYBRID MOLTEN/SOLID SODIUM ANODE FOR ROOM/INTERMEDIATE TEMPERATURE ELECTRIC VEHICLE BATTERY

(71) Applicant: Ceramatec, Inc., Salt Lake City, UT (US)

(72) Inventor: Sai Bhavaraju, West Jordan, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 101 days.

(21) Appl. No.: 14/292,130

(22) Filed: May 30, 2014

(65) Prior Publication Data

US 2014/0356654 A1    Dec. 4, 2014

Related U.S. Application Data

(60) Provisional application No. 61/829,136, filed on May 30, 2013.

(51) Int. Cl.

| | | |
|---|---|---|
| *H01M 4/38* | (2006.01) | |
| *H01M 2/40* | (2006.01) | |
| *H01M 4/134* | (2010.01) | |

(Continued)

(52) U.S. Cl.
CPC ............. *H01M 4/381* (2013.01); *H01M 2/40* (2013.01); *H01M 4/134* (2013.01); *H01M 10/054* (2013.01); *H01M 10/056* (2013.01); *H01M 10/39* (2013.01); *H01M 10/615* (2015.04); *H01M 10/66* (2015.04);

(Continued)

(58) Field of Classification Search
CPC .......... H01M 10/054; H01M 10/056; H01M 10/39; H01M 10/615; H01M 10/66; H01M 2220/20; H01M 2300/0045; H01M 2300/0074; H01M 2/40; H01M 4/134; H01M 4/381
See application file for complete search history.

(56) References Cited

U.S. PATENT DOCUMENTS

| | | |
|---|---|---|
| 3,847,667 A | 11/1974 | Werth |
| 4,335,191 A | 6/1982 | Peled |

(Continued)

FOREIGN PATENT DOCUMENTS

| | | |
|---|---|---|
| EP | 2490293 | 8/2012 |
| JP | 08321322 | 12/1996 |

(Continued)

OTHER PUBLICATIONS

Shin, Ju C., "International Search Report", PCT Application No. PCT/US2014/054339 (Corresponding to U.S. Appl. No. 14/478,676), (Dec. 15, 2014),1-3.

(Continued)

*Primary Examiner* — Carlos Barcena
(74) *Attorney, Agent, or Firm* — Paul S. Cha (57) ABSTRACT

A hybrid battery with a sodium anode is designed for use at a range of temperatures where the sodium is solid and where the sodium is molten. When the battery is at colder temperatures or when the vehicle is idle and needs to be "started," the anode will be solid sodium metal. At the same time, the battery is designed such that, once the electric vehicle has been "started" and operated for a short period of time, heat is directed to the battery to melt the solid sodium anode into a molten form. In other words, the hybrid battery operates under temperature conditions where the sodium is solid and under temperature conditions where the sodium is molten.

20 Claims, 4 Drawing Sheets

(51) Int. Cl.
*H01M 10/054* (2010.01)
*H01M 10/056* (2010.01)
*H01M 10/39* (2006.01)
*H01M 10/615* (2014.01)
*H01M 10/66* (2014.01)

(52) U.S. Cl.
CPC ...... *H01M 2220/20* (2013.01); *H01M 2300/0045* (2013.01); *H01M 2300/0074* (2013.01); *Y02E 60/122* (2013.01)

(56) References Cited

U.S. PATENT DOCUMENTS

| | | | |
|---|---|---|---|
| 4,894,298 | A | 1/1990 | Vukson et al. |
| 5,019,466 | A | 5/1991 | Coetzer et al. |
| 5,053,294 | A * | 10/1991 | Sernka ............... H01M 2/0252 429/104 |
| 6,007,943 | A | 12/1999 | Coetzer |
| 6,187,479 | B1 | 2/2001 | Liu |
| 2005/0260460 | A1 | 11/2005 | Kishi et al. |
| 2006/0141346 | A1 | 6/2006 | Gordon et al. |
| 2008/0268327 | A1 | 10/2008 | Gordon et al. |
| 2009/0134842 | A1 | 5/2009 | Joshi et al. |
| 2010/0279174 | A1 | 11/2010 | Young |
| 2010/0297537 | A1* | 11/2010 | Coors ................. C04B 35/01 429/532 |
| 2011/0104526 | A1 | 5/2011 | Boxley et al. |
| 2011/0199042 | A1 | 8/2011 | Abe |
| 2011/0223460 | A1 | 9/2011 | Farmer |
| 2012/0021273 | A1 | 1/2012 | Ohmori et al. |
| 2012/0219833 | A1 | 8/2012 | Coors et al. |
| 2014/0210422 | A1 | 7/2014 | Bhavaraju et al. |
| 2014/0212707 | A1 | 7/2014 | Bhavaraju et al. |

FOREIGN PATENT DOCUMENTS

| | | |
|---|---|---|
| JP | 2004178991 | 6/2004 |
| JP | 2009009933 | 1/2009 |
| KR | 20100027321 | 3/2010 |
| KR | 20130098236 | 9/2013 |
| WO | WO2010110465 | 9/2010 |
| WO | WO2010135283 | 11/2010 |
| WO | WO2012114951 | 8/2012 |
| WO | WO2012117916 | 9/2012 |
| WO | WO2012132813 | 10/2012 |

OTHER PUBLICATIONS

Shin, Ju C., "Written Opinion of the International Searching Authority", PCT Application No. PCT/US2014/054339 (Corresponding to U.S. Appl. No. 14/478,676), (Dec. 15, 2014),1-3.

Yuki, Saori "Japanese Office Action", Japanese App No. JP2013-537914, (Sep. 8, 2015),1-8.

Motohiro, Fukuhara "English Language Abstract", KR20100027321, (Mar. 11, 2010),1.

Soo, et al., "English Language Abstract", KR20130098236, (Sep. 4, 2013),1.

Cho, Ki Y., "International Search Report", PCT application US2011/059624 (Corresponding to U.S. Appl. No. 13/290,716), (May 22, 2012),1-3.

Cho, Ki Y., "Written Opinion of the International Searching Authority", PCT application US2011/059624 (Corresponding to U.S. Appl. No. 13/290,716), (May 22, 2012),1-3.

Totsuka, Kazuhide "Patent Abstracts of Japan (JP 08-321322)", English Language Abstract of Japanese patent publication JP JP 08-321322, (Dec. 3, 1996),1.

Bito, et al., "Bibliographical Data and Abstract of JP2004178991", Japanese Published Patent Application JP 2004178991, (Jun. 24, 2004),1.

Wang, et al., "Room temperature Na/S batteries with sulfur composite Cathode Material", *Electrochemistry Communications 9* (*2007*), Elsevier, (Jun. 18, 2006),31-34.

Shin, Ju C., "International Search Report", PCT Application No. PCT/US14/41329 (Corresponding to U.S. Appl. No. 14/298,302), (Oct. 2, 2014),1-3.

Shin, Ju C., "Written Opinion of the International Searching Authority", PCT Application No. PCT/US14/41329 (Corresponding to U.S. Appl. No. 14/298,302), (Oct. 2, 2014),1-6.

Kim, et al., "The Role of Additives in the Electroreduction of Sodium Ions in Chloroaluminate-Based Ionic Liquids", *Journal of the Electrochemical Society*, 2005, vol. 152, No. 1, pp. E9-E13, (Dec. 1, 2004),E9-E13.

Lang, et al., "Catalytic additives for the reversible reduction of sodium in chloroaluminate ionic liquids", *Electrochimica Acta*, 2006, vol. 51, Iss. 19, pp. 3884-3889, (Dec. 27, 2005),3884-3889.

Choi, Sang W., "International Search Report", PCT Application No. PCT/US2014/0423698 (Corresponding to U.S. Appl. No. 14/205,019), (Jul. 29, 2014),1-3.

Choi, Sang W., "Written Opinion of the International Searching Authority", PCT Application No. PCT/US2014/0423698 (Corresponding to U.S. Appl. No. 14/205,019), (Jul. 29, 2014),1-6.

Shin, Ju C., "International Search Report", PCT Application No. PCT/US2014/40297 (Corresponding to U.S. Appl. No. 14/292,130), (Sep. 25, 2014),1-3.

Shin, Ju C., "Written Opinion of the International Searching Authority", PCT Application No. PCT/US2014/40297 (Corresponding to U.S. Appl. No. 14/292,130), (Sep. 25, 2014),1-6.

Shozo, Fujiwara "English Language Abstract", JP2009009933, (Jan. 15, 2009),1.

Cho, Han S., "International Search Report", PCT Application No. PCT/US14/57462 (Corresponding to U.S. Appl. No. 14/496,509), (Jan. 9, 2015),1-3.

Cho, Han S., "Written Opinion of the International Searching Authority", PCT Application No. PCT/US14/57462 (Corresponding to U.S. Appl. No. 14/496,509), (Jan. 9, 2015),1-4.

Shin, Ju C., "International Search Report", PCT Application No. PCT/US2014/024066 (Corresponding to U.S. Appl. No. 14/205,772), (Jun. 27, 2014),1-3.

Shin, Ju C., "Written Opinion of the International Searching Authority", PCT Application No. PCT/US2014/024066 (Corresponding to U.S. Appl. No. 14/205,772), (Jun. 27, 2014),1-6.

Li, et al., "Rechargeable Ni—Li Battery Integrated Aqueous/Non Aqueous System", *Energy Technology Research Institute, National Institute of Advanced Industrial Science and Technology*, (Oct. 5, 2009),15098-15099.

Carrico, Robert S., "Non-Final Office Action", U.S. Appl. No. 13/290,716, (Jul. 22, 2014),1-15.

Carrico, Robert S., "Notice of Allowance", U.S. Appl. No. 13/290,716, (Oct. 29, 2014),1-8.

Hueso, et al., "High Temperature Sodium Batteries: Status, challenges and future trends", *Energy & Environmental Science*, 2013, 6, 734-749, (Jun. 14, 2013),734-749.

Sudworth, J.L. "The sodium/nickel chloride (ZEBRA) battery", *Journal of Power Sources 100* (*2001*) 149-163, (Jan. 1, 2001),149-163.

Eoff, Anca "Non-Final Office Action", U.S. Appl. No. 14/298,302, (Nov. 18, 2015),1-19.

* cited by examiner

HYBRID MOLTEN/SOLID SODIUM ANODE FOR ROOM/INTERMEDIATE TEMPERATURE ELECTRIC VEHICLE BATTERY

CROSS-REFERENCE TO RELATED APPLICATION

This application claims the benefit of U.S. Provisional Patent Application No. 61/829,136, filed May 30, 2013, entitled HYBRID MOLTEN/SOLID SODIUM ANODE FOR ROOM/INTERMEDIATE TEMPERATURE ELECTRIC VEHICLE BATTERY. The foregoing application is incorporated by reference.

FIELD OF THE INVENTION

The present invention relates to a battery for an electric vehicle (EV). More specifically, the present embodiments relate to a sodium anode battery for use in an electric vehicle that operates at low temperatures (with a solid sodium anode) when the vehicle is being started but operates at higher temperatures (with a molten sodium anode) while the vehicle is running.

BACKGROUND OF THE INVENTION

There is a constant desire to increase the efficiency of batteries, especially batteries that are designed to be used in electric vehicles. It has been determined that the presently used "lithium ion batteries" are not suitable for use in electric vehicles. One reason for this is that the present supplies of lithium on the planet are not believed to be sufficient to satisfy the demands associated with electric vehicle batteries. Accordingly, there is a need in the art for a new type of battery that is designed for use in electric vehicles that is made of plentiful materials such as sodium.

BRIEF SUMMARY OF THE INVENTION

The present disclosed embodiments relate to a "hybrid" battery that includes sodium at the anode. This hybrid battery is designed for use at a range of temperatures. For example, when the battery is at colder temperatures or when the vehicle is idle and needs to be "started," the anode will be solidified sodium metal. (Accordingly, when metal is plated onto the anode in this state, it is plated as solid metal.) Such batteries using solidified sodium metal could be capable of starting or operating the vehicle at temperatures ranging down to −30° C. or even as low as −50° C. At the same time, the battery is designed such that, once the electric vehicle has been "started" and operated for a short period of time, heat from the vehicle's engine is directed to the battery. This heat operates to "melt" the solid sodium anode into a molten form. In other words, after a short period of time, the heat from the vehicle converts the anode into a molten sodium anode. (When the anode is molten, the produced sodium will be molten and will be added to the molten anode.) Solid sodium anodes, while they are appropriate for use at cold temperatures, place high demands on the current density and power of the battery. Thus, by converting the anode into a molten anode (such as, for example, by heating the anode to temperature of from about 100 to 130° C.), the battery would have a greater power and current density than would otherwise be possible with a purely solid-state sodium anode.

It should be noted that this "hybrid" battery that uses both a solid and molten Na anode (depending upon the temperature) solves some of the problems associated with conventional batteries. For example, batteries that only use a molten Na anode can only be operated at temperatures of about 100° C. or higher, and thus may not work at colder temperatures. However, having the ability to use the battery (e.g., use the battery to "start" the vehicle engine) at temperatures below 100° C. (and even at temperatures as low as −50° C.) is a necessity for any elective vehicle battery so that the vehicle will continue to work during the colder winter months (or in colder climates). At the same time, having the battery use a molten Na anode after a period of time (e.g., after having heat from the vehicle be directed to the anode to cause the Na to melt) also achieves a beneficial property in that a molten Na anode provides greater efficiency and greater power than would be available with a solid Na anode. Thus, the present battery provides the advantages associated with using a molten Na anode, but also provides the ability to start the vehicle and use the battery at lower temperatures (e.g., solves the "cold start" problem).

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present embodiments will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the methods and cells of the present invention, as represented in the figures, is not intended to limit the scope of the invention, as claimed, but is merely representative of present embodiments of the invention.

The disclosed invention is drawn to a new electric vehicle (EV) sodium anode battery designed to operate over a broad temperature range of about −30° C. to 130° C. Over this temperature range the sodium anode is solid below about 100° C. and molten above about 100° C. The disclosed battery is designed to have a specific energy of about 350 Wh/kg, an energy density of about 750 Wh/l, a calendar life of about 15 years, and a cycle life of 1,000 cycles or more. Thus, the novel hybrid sodium secondary battery for electric vehicle application operates at a temperature ranging from sub-ambient temperatures up to about 130° C. under conditions where the sodium is solid and where the sodium is molten.

In one non-limiting embodiment, the battery includes: (1) sodium anode and an anolyte solution for reversibly depositing sodium, (2) an effective and low-cost cathode and catholyte solution, (3) a solid sodium ion selective, conducting separator, and (4) a unique cell design allowing realization of high energy and power densities under hybrid solid/molten sodium temperature conditions.

The anode may be sodium metal, either in solid and molten state. Sodium metal is used in the disclosed electric vehicle application because it is inexpensive, plentiful, can form high voltage electrode couples, has low melting point, is kinetically facile, and is mechanistically simple (compared to multivalent metal ions). Lithium cannot compete on the basis of cost, divalent metals are electrochemically more challenging, and higher molecular weight metals do not have the same energy density. A low-temperature battery that uses a solid sodium metal anode has not been possible for a variety of reasons, including the difficulty of finding a single electrolyte that can serve as both anolyte and catholyte, reversible plating of solid sodium at high coloumbic efficiency, and the poor cathode performance in the current catholytes at low temperature. A particularly innovative concept proposed here is a unique cell construction based on the use of a NaSICON solid electrolyte separator and consisting of dual "hybrid" solid/molten sodium anode. The NaSICON solid separator eliminates the need for a single electrolyte and the anolyte and catholyte can be composed of different chemistries at the respective electrodes.

The anolyte solution may comprise an ionic liquid (IL). The anolyte solution may contain a sodium salt dissolved in an ionic liquid (IL) with organic and inorganic ion additives. Non-limiting examples of such ion additives include chloroaluminate, tetrafluoroborate (TFB), triflate (TFO), bis (fluorosulfonyl)imide (FSI), and bis(trifluoromethanesulfonyl)imide (TFSI) anions and alkyl imidazolium (IM), pyrrolidinium (PY) and asymmetric quaternary ammonium (QA) cations.

The anolyte solution may increase the reversibility and coulombic efficiency of the sodium deposition process between –30° C. and 100° C. through: (i) use of solid electrolyte interface (SEI) forming additives; (ii) creation of low-temperature ILs incorporating inorganic anions with or without organic ones; (iii) use of ultra-thin ILs where the supply of non-SEI forming compounds is limited; and (iv) the use of stable, nano-particulate fillers to limit the IL/sodium reactivity, while maintaining the highest electrolyte conductivity over the same temperature range. At the same time, the anolyte layer may be thin (or "ultra-thin") so as limit the parasitic sodium reaction(s).

Any known or novel cathode and catholyte solution may be used that is suitable for use in a sodium anode secondary battery at the disclosed operating temperatures. A cathode comprising sulfur, metal-halide, metal hydroxide, and carbonophosphates may be used along with highly sodium-ion conductive aqueous or ionic-liquid catholyte solutions. Non-limiting examples of known cathode systems include $Ni(OH)_2$, S, and $ZnCl_2$. Non-limiting examples of the catholyte solutions include (i) aqueous and protic organic solvents with dissolved NaOH for $Ni(OH)_2$ cathode, (ii) $NaAlCl_4$ based ILs or organic solvents (e.g. tetraglyme, n-methyl formamide) with dissolved sodium salts for S cathode, and (iii) $NaAlCl_4$ or organic chloride (e.g. choline chloride) with dissolved Na salts based ILs for $ZnCl_2$ cathode. These low-cost cathodes and catholyte solutions are useful in providing a low EV battery cost target (~$100 per kWh), and may also enable meeting the desired cycle life and energy density targets.

The battery in one disclosed embodiment integrates a solid sodium-ion conducting ceramic electrolyte membrane having high low-temperature conductivity which provides physical separation between cathode and anode compartments to eliminate crossover and unwanted side reactions. The proposed ceramic electrolyte is a sodium-ion conductor. In one embodiment, the ceramic electrolyte is made of sodium super ion conductor membrane (NaSICON) that is stable against molten sodium and that has high room-temperature sodium-ion conductivity. These membranes can be produced with thin and dense functional layers supported by thick and porous support layers.

With respect to the membrane, NaSICON has excellent conductivity (4 mS/cm and as high as 100 mS/cm at 175° C.). The membrane may, in some embodiments, be between 50-250 microns thick to reduce the voltage drop ("IR drop") within the battery. Moreover, one of the features of NaSICON is the ability to operate effectively with two distinctive environments on opposite sides of the membrane. This means that the solutions for the anolyte and catholyte may be different, the pressures on each side of the membrane may be different, the reactants and reaction conditions on each side of the membrane may be different, etc. In other words, the designer of the cell can tailor/select reactants/conditions for both the anolyte and catholyte that optimize each specific reaction.

NaSICON is commercially available ceramic membrane material from Ceramatec, Inc. of Salt Lake City Utah. U.S. Patent Application Publication No. 2007/0138020 describes non-limiting structure and properties of NaSICON membrane as well as other membrane materials (such as Beta Alumina materials) that may be used in the present embodiments. The entire disclosure of this published U.S. application is expressly incorporated herein by reference. Non-limiting examples of NaSICON materials have a nominal composition $Na_{1-x}Zr_2Si_xP_{3-x}O_{12}$ (x=0-3, typically 2-2.5).

NaSICON ceramic membrane may be fabricated in a variety of different conformations, including supported designs that allow for minimization of the fully dense functional layer thickness (to maximize conductance) without compromising mechanical strength.

A unique cell design may allow operation over the wide temperature range. In one embodiment the cell uses a hybrid sodium anode that can function from about –30° C. to 130° C. (offering cold-start and high power benefits). The cell design may include a flow option for both anolyte and catholyte to improve electrode performance and safety. The cell may include sealing materials and stacked bi-polar construction in planar configuration to achieve energy density and cost objectives.

Figure 1:
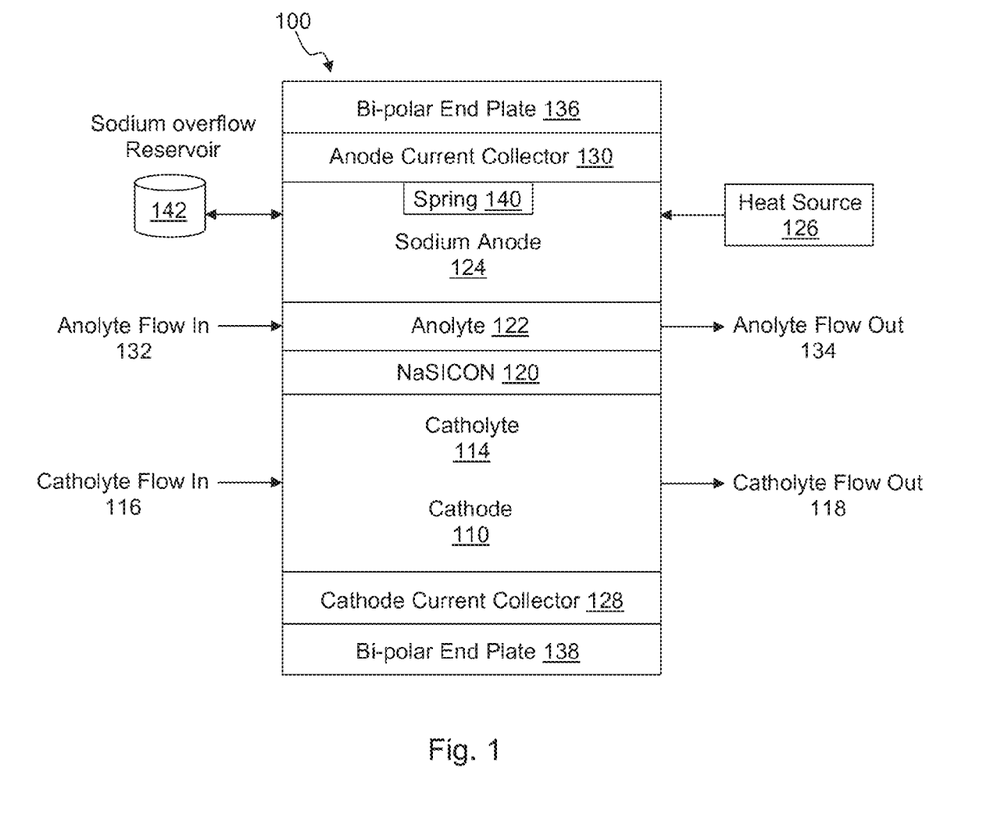
FIG. 1 is a diagrammatic representation of a hybrid sodium anode electric vehicle battery within the scope of the disclosed invention.

FIG. 1 shows one possible configuration of a hybrid sodium anode battery architecture disclosed herein. The hybrid battery 100 has a cathode 110 that will be attached to a cathode current collector 112 (which may be mesh). A catholyte solution or catholyte 114 may be in contact with the cathode 110. More specifically, the catholyte 114 may flow through the battery (so that it is in contact with the cathode) through an inlet 116 and an outlet 118. The catholyte 114 brings quantities of the reactants in contact with the cathode 110 where it may undergo an electrochemical reaction.

The catholyte 114 may also contact a solid membrane separator 120. The membrane separator 120 may be a sodium ion conductive membrane such as a NaSICON membrane (or other similar membrane) that separates the catholyte 114 from the anode side of the battery.

On the other side of the membrane separator 120 are an anolyte solution or anolyte 122 and a sodium anode 124. At lower temperatures, the sodium anode 124 will be in the solid form. However, after the electric vehicle has started and been running, heat from a heat source 126 may be transmitted to the sodium anode, thereby melting the solid sodium and converting it into molten sodium. The heat source 126 may comprise heat generated during operation of the electric vehicle, such as from one or more motors and the electric vehicle moving parts. The heat source 126 may comprise heat from an electric heater or from the battery operation itself.

In some embodiments, an anolyte solution or anolyte 122 is disposed between the sodium anode 124 and the NaSICON membrane separator 120. The purpose for this is that solid sodium, if it solidifies during the battery operation, may operate to crack the ceramic NaSICON membrane (because of built-up of stress on the surface of the NaSICON). Accordingly, in some non-limiting embodiments, a quantity of anolyte will always be located between the membrane separator 120 and sodium anode 124 (either molten or solid).

The disclosed battery has a specific orientation that utilizes a planar NaSICON membrane with the anode compartment at the top and cathode compartment at the bottom. The cathode compartment contains the catholyte 114 and cathode 110 which are in contact with NaSICON membrane separator 120. The catholyte 114 may optionally be circulated from an external reservoir, as shown by the catholyte flow in 116 and the catholyte flow out 118. A cathode current collector 128 is shown to be positioned at the bottom of the battery 100. It is understood that the cathode compartment design is expected to be different based upon the type of cathodes that is utilized.

The anode compartment contains sodium anode 124 in contact with an anolyte 122. A anode current collector 130 is shown positioned at the top of the battery 100 in contact with the sodium anode 124. As shown in FIG. 1, the sodium metal is on top of the anolyte which is in contact with the NaSICON membrane. This situation results from the relative differences in density of the materials, the low density of sodium metal ~0.97 g/cc in solid state and ~0.93 g/cc in liquid-state compared to the projected densities of the organic or IL based anolyte solutions with dissolved sodium salts. Thus, it is anticipated that the liquid anolyte solution will be disposed between the solid sodium and the membrane because of its higher density. However, in the event that sodium remains in contact with membrane, incorporating a macroprous/microporous structure between sodium and NaSICON to facilitate their separation may be desired.

During electric vehicle operation (discharge), the sodium metal anode will act as a "hybrid" anode that is functional between $-30°$ C. and $130°$ C. by being solid and molten at different temperatures and time periods during operation. The molten sodium anode is preferable because of high current density and power capability, as well as decreasing cell inefficiencies through elimination of dendrite formation. This is achieved by utilizing a flowing anolyte concept, as shown by the anolyte flow in 132 and the catholyte flow out 134. During cold-start and low temperature operation a thin-film of liquid anolyte will be used to fill the gap between the solid sodium anode and the NaSICON membrane. The cell will heat during operation from the heat source 126, which may include joule heating, other waste heat sources in the vehicle, or independent heater, ultimately reaching the modest operating temperature of about $100°$ C. when sodium will melt. At this time, the anolyte circulation will be stopped, and molten sodium will be in direct contact with NaSICON. The purpose of the liquid anolyte at lower temperature is to ensure sodium ion transfer from solid sodium to solid NaSICON membranes.

The liquid anolyte 122 is preferably ionic liquid based because ionic liquids are one of the few electrolytes from which sodium can be electrodeposited at low temperature as well as it being stable with Na at high temperatures. In addition, the ionic liquid has near zero vapor pressure and is non-flammable, thus contributing to operational safety. The voltage drop across the ionic liquid layer can be minimized by optimizing the properties (freezing point, conductivity, and coulombic efficiency) of the ionic liquid. Non-limiting examples of presently preferred ionic liquids include the following (i) anions: tetrafluoroborate (TFB), triflate (TFO), bis(fluorosulfonyl)imide (FSI), and bis(trifluoromethanesulfonyl)imide (TFSI), and (ii) cations: alkyl imidazolium (IM), pyrrolidinium (PY) and asymmetric quaternary ammonium (QA) types.

Ion conductivity at low temperature is critical to the operation of the hybrid battery since starting from a plug-free situation at ambient temperature is necessary. The molecular symmetry and molecular weight are both important factors in affecting glass transition temperatures and melting point. Asymmetric cations are more difficult to crystallize, and thus have lower melting points. The melting point of mixed-cation molten salts is significantly lower than the value for a single cation molten salt.

As previously noted, the electrochemical stability may be improved through the use of solid electrolyte interface (SEI) forming additives. Such additives can improve the coulombic efficiency of sodium deposition and stripping. However, because of the use of the hybrid configuration here where deposition of solid sodium is not essential (it can be done in the molten form when the IL is not involved), one must distinguish between coulombic losses due to the more negative deposition overpotential versus coulombic losses at open circuit. The addition of a Lewis acid renders the sodium cation more accessible to deposition. Other additives, such as trichloromethane, appear to improve the coulombic efficiency by forming stabilizing layers.

The hybrid battery 100 will operate longest when the sodium is in the molten form, between about $100°$ C. and $130°$ C. During shutoff, once the temperature has dropped below about $100°$ C., the anolyte circulation will resume and the anolyte layer will be reestablished between and solid sodium anode and NaSICON membrane. These features allow high energy and power densities to be realized while providing versatile options for form factor of the EV battery. Intermediate temperature (between $100°$ C. and $130°$ C.) operation has further advantages including: 1) improving materials durability; 2) allowing cost-effective cell and stack materials; and 3) simplifying thermal management.

While not shown in the drawings, it is understood that the hybrid battery 100 may include sensors, such as temperature, pressure and/or flow rate sensors, flow valves, pumps, and suitable control software and hardware to provide efficient operation of the hybrid battery 100 during the varying operating temperatures described herein.

The hybrid battery 100 may include bi-polar end plates 136, 138 to enable a stacked bi-polar construction in a planar configuration to improve energy density and low fabrication cost objectives.

During operation of the hybrid battery 100, sodium ions conduct through the NaSICON membrane separator 120. As a result the quantity of sodium within the anode compartment may change. In one non-limiting embodiment, a spring 140 may be provided so that it is in contact with the anode current collector 130. One of the purposes of the spring 140 is to ensure that, as the sodium anode 124 changes states (e.g., from solid to molten and vice versa) and the anode changes volume, the current collector 130 remains in contact with the anode 124. In other words, the current collector 130 and/or the anode 124 are spring-biased in order to ensure that there sufficient contact with the anolyte so that the battery continues to operate. In some embodiments, the spring 140 may be desirable to help the battery function while the anode is changing from solid to liquid and vice versa.

In another non-limiting embodiment, a sodium overflow reservoir 142 may be provided to receive excess sodium during hybrid battery charge and to provide sodium during discharge. The sodium overflow reservoir 142 may be separate from the anode compartment or an extension of the anode compartment. In another non-limiting embodiment, the anode compartment may be fabricated with a variable volume or bladder to accommodate the varying volume of sodium during hybrid battery operation.

In other non-limiting embodiments, the anolyte may be housed in a reservoir above the battery which would fill-in the void in the anode compartment during discharge and hold the excess anolyte during charging. The use of this anolyte layer may help with ensuring that the hybrid battery works properly, but the addition of the ionic liquid anolyte represents another potential coulombic loss and is lower power (lower current) than the liquid metal sodium battery. In other embodiments, there may be an "L" shaped battery cell design with NaSICON on the side of the "L-shape" and another NaSICON layer on top. The sodium is in direct contact with NaSICON on the side of the structure but an ionic liquid anolyte flows into the space between the top of the sodium anode and the NaSICON. This L-shaped battery design could use a common cathode and an ionic liquid or other suitable material for the catholyte. In this design, the sodium, once molten, would always flow to the bottom of the anode. When cooled, the sodium would have free volume on top to expand therein.

The catholyte and anolyte may, depending upon the particular hybrid battery design, flow into the respective anolyte and catholyte compartments with the electrode (and then flow out of the compartment for replenishment). Alternatively, the hybrid battery may be a "stagnant" system where the anolyte/catholyte remains within the electrode compartment. In some further embodiments, there may be a "hybrid" concept with sodium ion containing anolyte being stagnant and flowing catholyte (particularly if an aqueous catholyte is used) to minimize exposure of sodium to the catholyte. Of course, other embodiments may be designed in which the catholyte flows and the anolyte is stagnant. Further embodiments may be designed in which both the catholyte/anolyte are stagnant or both the catholyte/anolyte flow.

Further embodiments may be designed in which the anolyte is housed in a separate tank than the anode and a small amount of anolyte is allowed to flow in between the anode and the NaSICON membrane. Housing the anolyte in a different tank than the anode may be advantageous as it could decrease the size of the battery.

Figure 2:
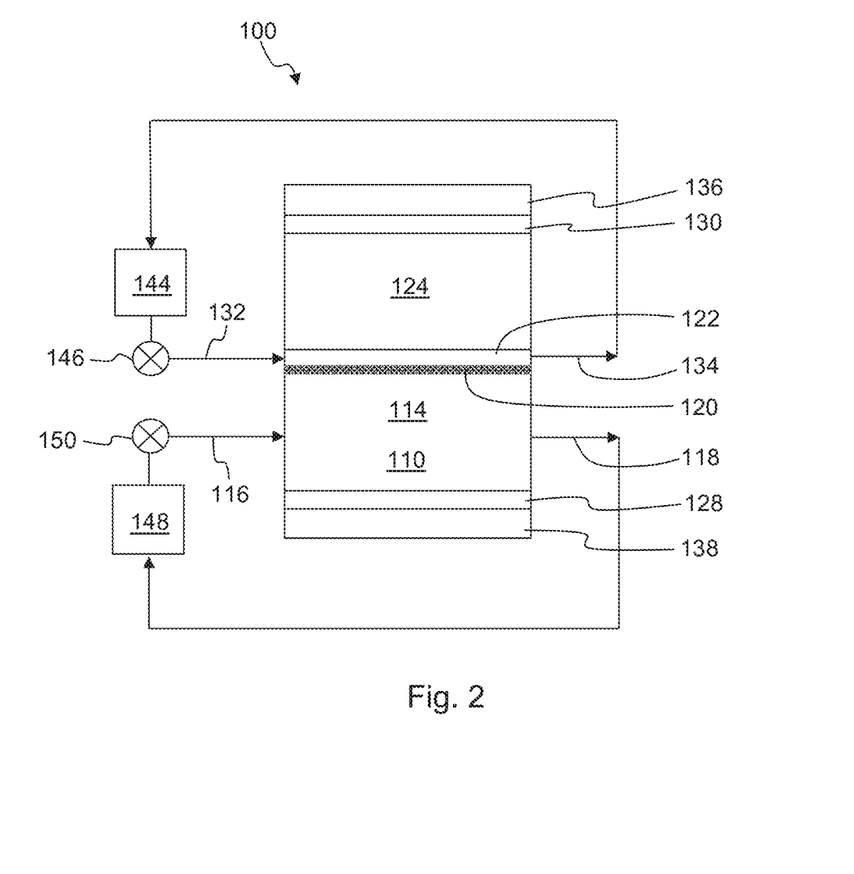
FIG. 2 is a schematic representation of the hybrid sodium anode electric vehicle battery of including optional anolyte and catholyte reservoirs.

FIG. 2 shows the hybrid battery 100 similar to FIG. 1 with external anolyte and catholyte reservoirs to enable the disclosed hybrid battery configurations. In a disclosed embodiment, an external anolyte reservoir 144 is provided for the anolyte 122 to be circulated to the hybrid battery 100, via anolyte flow in 132. The external anolyte reservoir 144 may also receive anolyte removed from the battery via anolyte flow out 134. One or more anolyte valves 146, in combination with suitable sensors, pumps, and electronic control equipment (not shown), control anolyte circulation within the anolyte compartment.

Similarly, in a disclosed embodiment, an external catholyte reservoir 148 is provided for the catholyte to be circulated to the hybrid battery 100, via catholyte flow in 116. The external catholyte reservoir 148 may also receive catholyte removed from the battery via catholyte flow out 118. One or more catholyte valves 150, in combination with suitable sensors, pumps, and electronic control equipment (not shown), control catholyte circulation within the catholyte compartment.

This hybrid flow-cell approach has at least three modes-of-operation that give the hybrid battery 100 a set of performance attributes unobtainable by any other EV battery. The three modes-of-operation involving the "hybrid" configuration (solid sodium anode with liquid anolyte or molten sodium anode in direct contact with NaSICON) that make this technology unique are as follows and described in relation to FIGS. 2 and 4A-4C. The first mode-of-operation is the ability to discharge the battery at low temperature when the sodium anode is solid, such as between about −30° C. and 100° C. since NaSICON remains conductive to sodium ions even at low temperatures, the anolyte is liquid, and the catholyte is also liquid. Second, the favorable kinetics of operating at higher temperature (about 110° C. and more generally between about 100° C. and 130° C.) leads to higher capacity and power for both electrodes and the overall battery. Third, charging will preferentially (but not necessarily) occur when the sodium anode is in the molten state and in direct contact with the NaSICON membrane separator.

There are several reasons why it is advantages to charge the hybrid battery while the sodium anode is in the molten state. Generally speaking, when a liquid anolyte is used along with solid sodium anode, loss of coulombic efficiency is observed. This loss in efficiency in room temperature sodium metal batteries occurs primarily during charging (i.e. deposition of sodium) and not during discharging. This is because at the sodium deposition potential, some of the charge goes to reducing the organic IL cation (although the rate can be very low) mostly for forming a Solid Electrolyte Interface (SEI) layer. Some organic cations are more difficult to reduce than others, and additives can be used to protect the surface. Inorganic cations are more stable but they lower the conductivity and raise the melting point (both undesirable effects). Thus, the disclosed hybrid battery configuration allows charging (under external plug-power) to occur in the molten anode state without the need for the IL anolyte between the NaSICON and the sodium.

It is also important to recognize that since the hybrid battery recharge can occur in the liquid-sodium state, the anolyte does not need to be involved in the process. Consequently, cation in the anolyte may not be exposed to the high negative overpotentials used to deposit solid sodium during low-temperature sodium plating. Thus, during operation of the hybrid battery, as the sodium anode temperature increases to the melting point, the anolyte circulation is stopped and, to the extent possible, the substantially all of the anolyte may be removed from the anode compartment.

Figure 3:
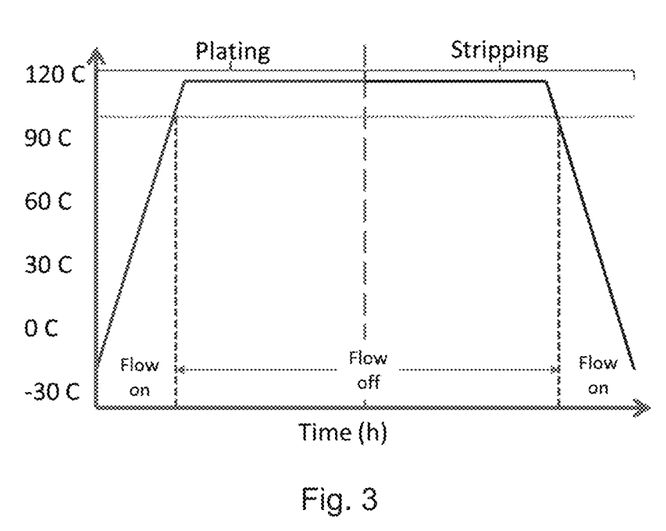
FIG. 3 is represents a sample thermal, flow, and charge/discharge cycling protocol for the disclosed hybrid sodium anode electric vehicle battery.
Figure 4A:
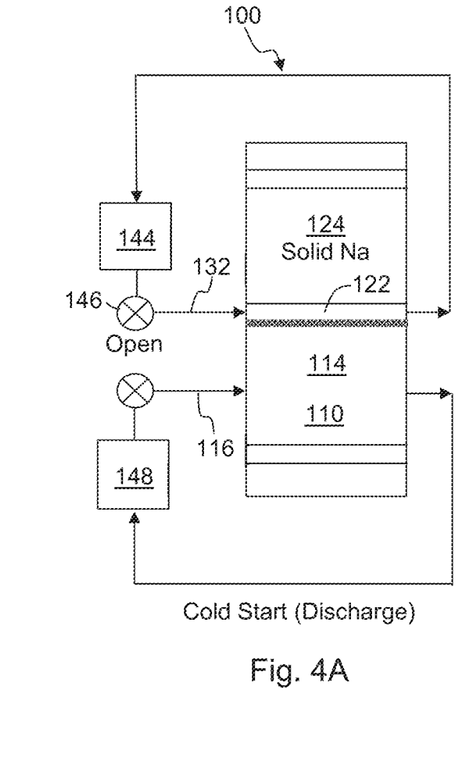
FIGS. 4A-4C are schematic representations of three modes of operation of the hybrid sodium anode electric vehicle battery of FIG. 2.
Figure 4B:
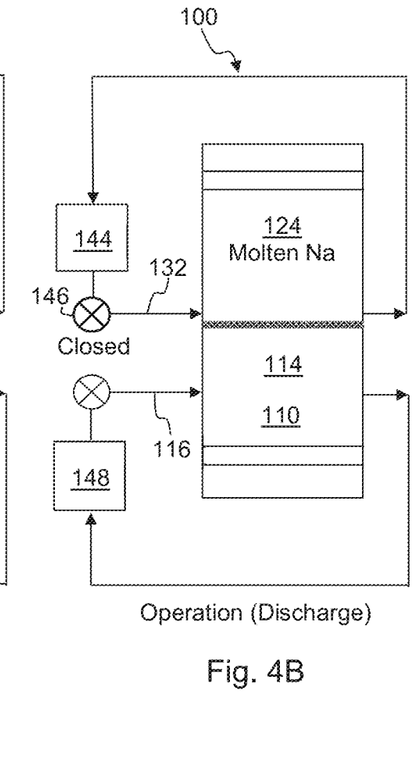
Figure 4C:
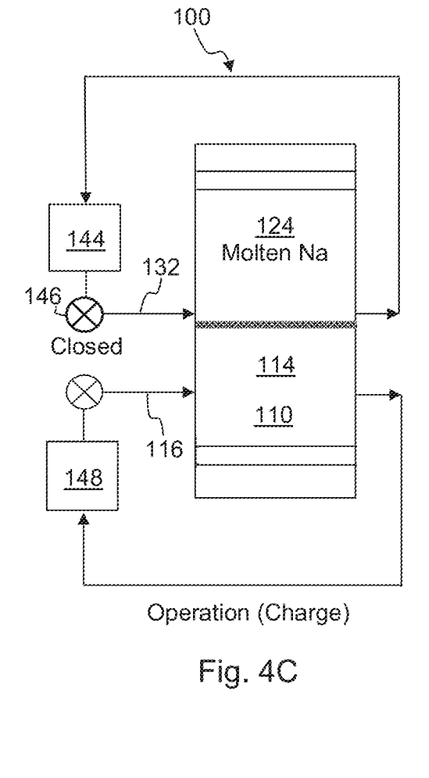

FIG. 3 discloses a sample thermal, flow, and charge/discharge cycling protocol to evaluate the operation of the disclosed hybrid battery. At a time 0, representing a cold start of the hybrid battery, the sodium anode temperature is approximately −30° C. At this temperature the sodium is solid and valve 146 is open permitting anolyte circulation, as shown in FIG. 4A. The sodium anode temperature is slowly increased. Once the temperature reaches 100° C. or greater, the valve 146 is closed to stop anolyte flow and the battery is operated for the longest time period (representing normal operation) with a molten sodium anode, as shown in FIG. 4B. The sodium anode temperature will then be decreased. When the sodium anode temperature cools to 100° C. or below, the valve 146 is opened and anolyte flow is resumed, as shown in FIG. 4A. The sodium anode temperature is cooled to a final temperature of about −30° C. As discussed above, the hybrid sodium anode battery is preferably charged when the sodium anode is in the molten state, as shown in FIG. 4C.

As noted above, the fact that NaSICON isolates the cathode from the anode means that any desired cathode may be used. Some of these potential cathodes include: sulfur, metal halide, Zn to ZnO and NiOOH to Ni(OH)$_2$, a halogen, air, and the like.

Table 1, below, summarizes details of three different cathodes that may be used in the disclosed hybrid battery.

readily available. Its theoretical capacity is 1672 mAh/g (based on conversion to Na$_2$S), which is one of the highest known using non-gaseous constituents. With this cathode, an ionic liquid or even water may be used as the catholyte and that this material can dissolve lower and higher sodium polysulfides, thereby making a low temperature liquid sulfur cathode analogous to high temperature one. One of the advantages of using sulfur materials with an ionic liquid is that there is no vapor pressure and there can be a more sealed system. Also, the sulfur cathode is safe to use. The theoretical specific energy of the Na—S cell operating at low temperature is 954 Wh/kg, which is higher than that of the high temperature Na—S cell because it can be cycled between sulfur and sodium sulfide materials as shown the reactions below:

Initial reaction: Na$^+$+x/16S$_8$+e$^-$ ↔ ½Na$_2$S$_x$, where x=4, 6, or 8

Intermediate Reaction: Na$^+$+½Na$_2$S$_x$+e$^-$ ↔ ½Na$_2$S$_y$, where x=4, 6, or 8 and y=x−2

Final Reaction: Na$^+$+½Na$_2$S$_2$+e$^-$ ↔ Na$_2$S

Overall Reaction: ⅟₁₆S$_8$+Na$^+$+e$^-$ ↔ ½Na$_2$S

The third cathode set forth in Table 1 is analogous to how a lithium ion battery cathode operates. The sodium metal carbonophosphate cathode reaction is:

M(CO$_3$)(PO$_4$)+3Na$^+$+3e$^-$→Na$_3$M(CO$_3$)(PO$_4$)

TABLE 1

Comparison of relevant parameters of the proposed cathodes

| Parameter | Cathode | | |
|---|---|---|---|
| | Ni(OH)$_2$ ↔ NiOOH | Na$_2$S ↔ Na$_2$S$_x$ | Na$_3$MnPO$_4$CO$_3$ ↔ NaMnPO$_4$CO$_3$ |
| Theoretical ED (Wh/kg)$^c$ | 734 | 760 | 678 |
| Expected cathode reaction type <130° C. | Solid state transformation | Solid-solid or liquid-liquid type | Intercalation type |
| Voltage | 3.2 | 2.05 | ~ 3.7 V |
| Catholyte | Aqueous NaOH | Organic or IL's with dissolved or undissolved polysulfides | Organic or IL solvents with dissolved sodium salts (AlCl$_4^-$ or PF$_6^-$) |
| Current collector | Ni foam | Graphite | Carbon |
| Operation T (° C.) | −20 to 130 | −40 to 180 | TBD |
| Flow possibility | Yes | Yes | Yes |

$^c$ when combined with Na anode

With the use of a NaSICON membrane separator, one may use two separately optimized electrolytes without concern of the electrolytes mixing between the cathode and anode compartments.

The "nickel" cathode has previously been extensively developed and used in commercial Ni-MH and Ni—Zn batteries. This cathode functions in an aqueous concentrated alkaline NaOH catholyte and the solid NaSICON membrane serves to separate it from the anode compartment. The relevant electrochemical reactions for the Na—NiOOH battery are:

Negative electrode: Na ↔ Na$^+$+e$^-$

Positive electrode: NiOOH+H$_2$O+e$^-$ ↔ Ni(OH)$_2$+OH$^-$

The net reaction is: Na+NiOOH+H$_2$O ↔ Ni(OH)$_2$+NaOH

The second cathode is the sulfur cathode, which has great potential because it is light, energetic, inexpensive and In the case of the first two cathodes, ions involved in the oxidation and reduction of the metal cathode are stored in the electrolyte necessitating a high volume of electrolyte. The exact volume of electrolyte needed will be determined by the solubility of that ion in the catholyte. This requires a thick layer of electrolyte (driving up the catholyte resistance) or a flow catholyte where the ion reservoir is held at a separate location. In the carbonophosphate cathode, the electrolyte serves as the sodium ion reservoir so that a thin layer (as thin as physically possible) is sufficient for sodium ion transport. The metal carbonophosphate changes phase to a sodium metal carbonophosphate. Magnesium carbonophosphate is presently preferred.

A metal halide cathode system may also be suitable in the disclosed hybrid battery. This is analogous to the ZEBRA battery cathode. The choices are chlorides, bromides and iodides of zinc, copper or nickel. ZnCl$_2$ would be a suitable example, but CuCl and NiCl$_2$ could also work and could provide higher voltages and may be better choices for reversible plating. The catholyte could be a sodium halide dissolved in ionic-liquid.

There are a number of important advantages of the disclosed hybrid battery chemistries. First, the battery cell voltages are expected to be relatively high (>2.0 V) and the cathodes with large capacities so the resultant energy density is high. Consequently, fewer cells are required to reach the high voltages (e.g., 40 V) and energy densities needed for electric vehicle use. Second, the active material costs are low and can be acquired in commodity-size quantities with little or no additional processing required prior to incorporation into the battery. These active material cost estimates are well within the requisite price point necessary for easily meeting DOE cost targets. Third, the moderate temperature of operation (<130° C.) facilitates the use of low-cost polymeric materials for battery construction. Finally, all of the active materials are available from domestic sources, and in fact the United States has historically been a net exporter of some of these materials.

Table lists some important fabrication and manufacturing advantages of the disclosed hybrid sodium anode batteries relative to the known high temperature NaS/ZEBRA batteries.

TABLE 2

| Na—S/ZEBRA | Proposed Na Battery |
| --- | --- |
| Battery and battery modules are constructed primarily using metal & ceramic components | Able to be constructed using lower cost polymeric materials |
| Sealing metals to ceramic components requires glass seals | Sealing polymers to other polymers or ceramics can use epoxies or plastic mechanical components (O-rings and gaskets) |
| High temperature swing (ambient to 350° C.) requires use of thermal expansion-matched components | Intermediate temperature swing (−30° C. to 130° C.); thermal expansion matched components is less critical |
| Conservation of heat in the battery stack dictates that the individual batteries are fabricated and arranged in specific geometries | Unique geometries and cell construction designs possible |
| High operation temperature results in lowering of energy efficiency due to requirement of additional heating input. | Lower operation temperature decreases the additional heat input requirement so waste heat onboard the vehicle can be used |
| Robust thermal insulation required to maintain high temperature | The thermal insulation requirements are simpler and less critical because of the hybrid design |

It should be noted that some electrical vehicles have requirements regarding the temperature of the external case of the battery. The purpose of this requirement is to keep this case sufficiently cool so that it may be touched by the vehicle driver. (In other words, if the vehicle driver opens the hood of the car and touches the battery case, it should not be "too hot" such that it burns his/her skin.) More specifically, many electric vehicle batteries require that the outside case of the battery not exceed a temperature of 52° C. (or perhaps 55° C.). Given that the internal workings of the battery may involve having molten sodium at temperatures between 100-130° C., there should be ample insulation (with acceptable thermal resistance) in the battery case or in other parts of the battery to ensure that the outer battery case temperature does not get too hot. However, such insulating is commonly known and may be easily achieved.

While specific embodiments of the present invention have been illustrated and described, numerous modifications come to mind without significantly departing from the spirit of the invention, and the scope of protection is only limited by the scope of the accompanying claims.

All the patent applications and patents listed herein are expressly incorporated herein by reference.

What is claimed is:

1. A hybrid sodium anode battery for an electric vehicle comprising:
   a sodium anode in contact with a supply of anolyte solution that dissolves sodium ions and is not degraded by sodium;
   a cathode in contact with a supply of catholyte solution; and
   a sodium ion conductive solid membrane separating the catholyte from the anolyte;
   wherein the hybrid sodium anode battery operates at a temperature where the sodium anode is in a solid state and a quantity of anolyte solution separates the solid state sodium from the sodium ion conductive membrane and wherein during operation, heat melts the sodium anode to convert the sodium anode into a molten state such that the hybrid sodium anode battery operates at a temperature where the sodium anode is molten.

2. The hybrid battery of claim 1, wherein the sodium ion conductive solid membrane is a NaSICON membrane.

3. The hybrid battery of claim 1, wherein the hybrid battery operates over a temperature range of about −30° C. to 130° C.

4. The hybrid battery of claim 1, wherein the heat to melt the sodium anode is provided by a heat source.

5. The hybrid battery of claim 4, wherein the heat source comprises waste heat from operation of the electric vehicle.

6. The hybrid battery of claim 4, wherein the heat source comprises a heater.

7. The hybrid battery of claim 1, further comprising an anode compartment housing the sodium anode and the supply of anolyte solution, wherein the anode compartment further comprises:
   an anolyte solution inlet;
   an anolyte solution outlet; and
   an anolyte solution reservoir disposed between the anolyte solution inlet and the anolyte solution outlet.

8. The hybrid battery of claim 1, further comprising an cathode compartment housing the cathode and the supply of catholyte solution, wherein the cathode compartment further comprises:
   an catholyte solution inlet;
   an catholyte solution outlet; and
   an catholyte solution reservoir disposed between the catholyte solution inlet and the catholyte solution outlet.

9. The hybrid battery of claim 1, further comprising:
an anode current collector in electrical contact with the sodium anode; and
a cathode current collector in electrical contact with the cathode.

10. The hybrid battery of claim 9, further comprising bi-polar end plates disposed adjacent the anode current collector and the cathode current collector.

11. The hybrid battery of claim 1, wherein the anolyte solution comprises comprise an ionic liquid (IL) containing dissolved sodium ions.

12. The hybrid battery of claim 11, wherein the anolyte solution further comprises one or more organic or inorganic ions selected from chloroaluminate, tetrafluoroborate (TFB), triflate (TFO), bis(fluorosulfonyl)imide (FSI), and bis(trifluoromethanesulfonyl)imide (TFSI) anions and alkyl imidazolium (IM), pyrrolidinium (PY) and asymmetric quaternary ammonium (QA) cations.

13. The hybrid battery of claim 1, further comprising a sodium reservoir coupled to the sodium anode to accommodate fluctuations in the volume of sodium anode during operation of the hybrid battery.

14. The hybrid battery of claim 1, further comprising insulation on an exterior case of the hybrid sodium anode battery to maintain a temperature on the exterior case less than or equal to 52° C.

15. A method of operating a hybrid sodium anode battery for an electric vehicle comprising:
obtaining a hybrid sodium anode battery comprising:
a sodium anode in contact with a supply of anolyte solution that dissolves sodium ions and is not degraded by sodium;
a cathode in contact with a supply of catholyte solution; and
a sodium ion conductive solid membrane separating the catholyte from the anolyte;
operating the hybrid sodium anode battery at a temperature where the sodium anode is in a solid state such that a quantity of anolyte solution separates the solid state sodium from the sodium ion conductive membrane;
heating the sodium anode to convert the anode into a molten state; and
operating the hybrid sodium anode battery at a temperature where the sodium anode is molten.

16. The method of operating a hybrid battery of claim 15, wherein the sodium ion conductive solid membrane is a NaSICON membrane.

17. The method of operating a hybrid battery of claim 15, wherein the hybrid sodium anode battery further comprises an anode compartment housing the sodium anode and the supply of anolyte solution, wherein the anode compartment further comprises:
an anolyte solution inlet;
an anolyte solution outlet; and
an anolyte solution reservoir disposed between the anolyte solution inlet and the anolyte solution outlet,
wherein the method further comprises circulating anolyte solution to the anode compartment while the sodium anode is in a solid state.

18. The method of operating a hybrid battery of claim 17, further comprising ceasing the circulation of anolyte solution to the anode compartment while the sodium anode is in a molten state.

19. The method of operating a hybrid battery of claim 15, further comprising charging the hybrid battery while the sodium anode is in a molten state.

20. The method of operating a hybrid battery of claim 15, wherein the anolyte solution comprises comprise an ionic liquid (IL) containing one or more organic or inorganic ions selected from chloroaluminate, tetrafluoroborate (TFB), triflate (TFO), bis(fluorosulfonyl)imide (FSI), and bis(trifluoromethanesulfonyl)imide (TFSI) anions and alkyl imidazolium (IM), pyrrolidinium (PY) and asymmetric quaternary ammonium (QA) cations.

* * * * *